March 15, 1927.
W. S. H. HAMILTON
1,621,403
BRAKING SYSTEM
Filed June 4, 1925     3 Sheets-Sheet 1
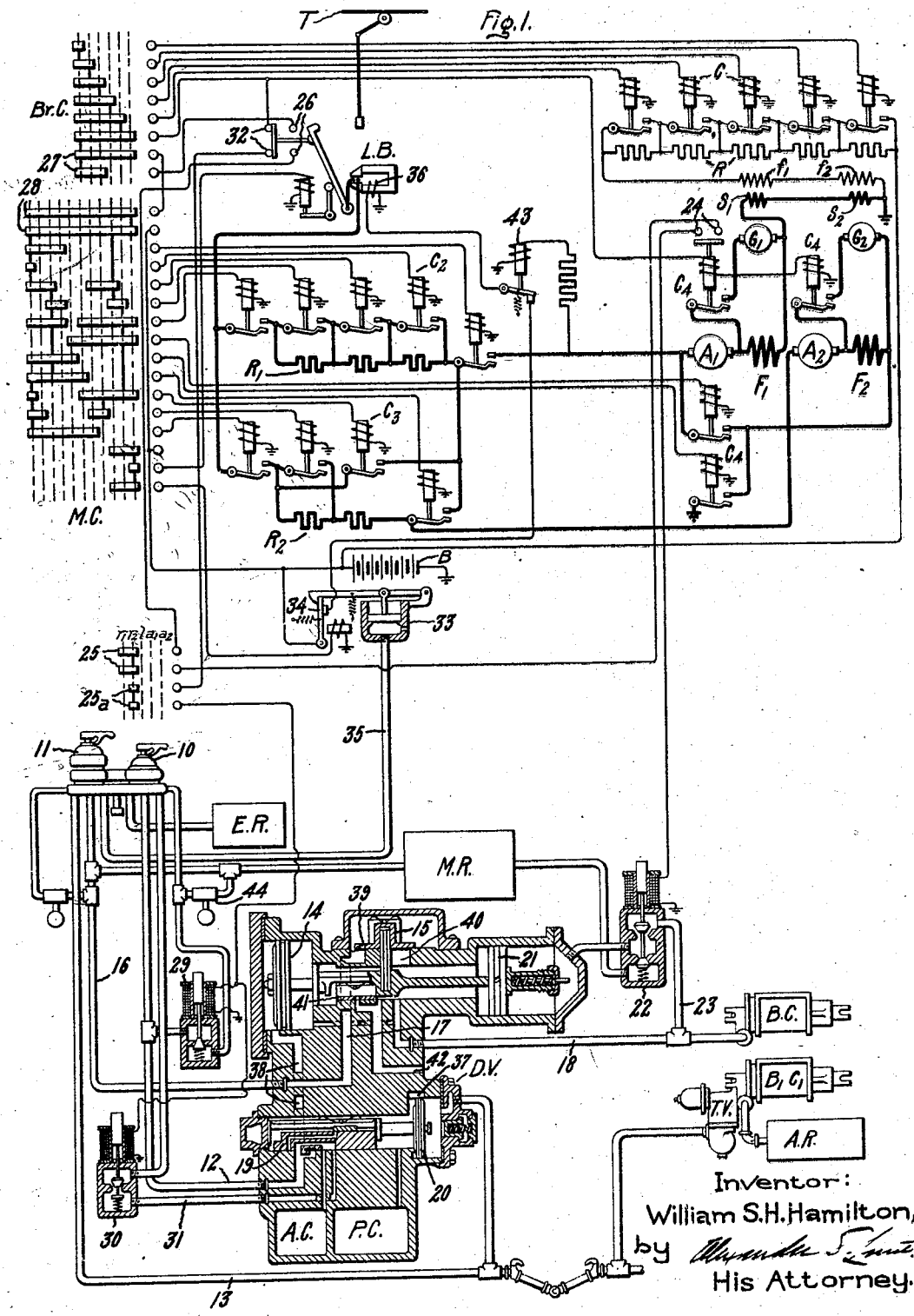
Inventor:
William S. H. Hamilton,
by
His Attorney.

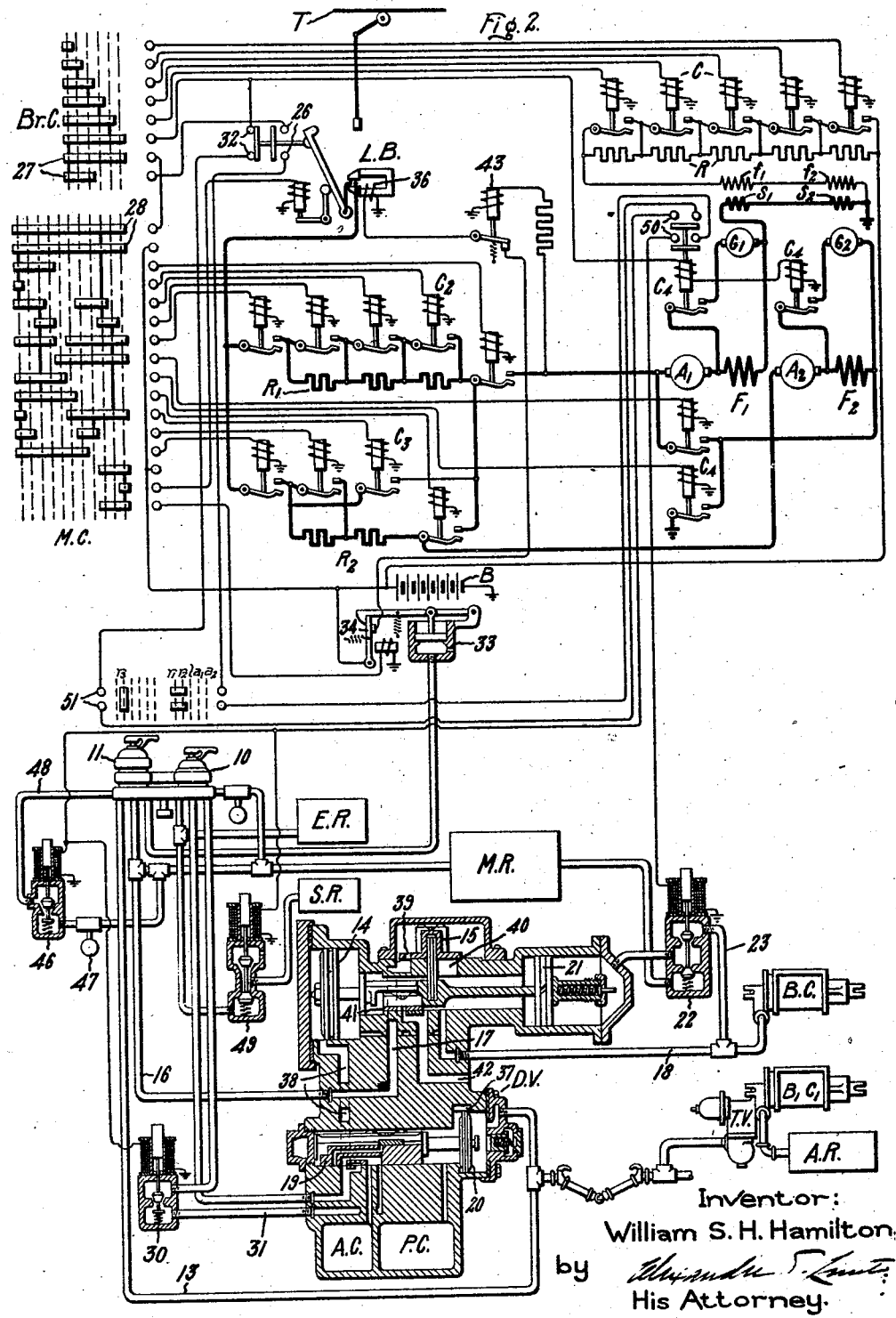

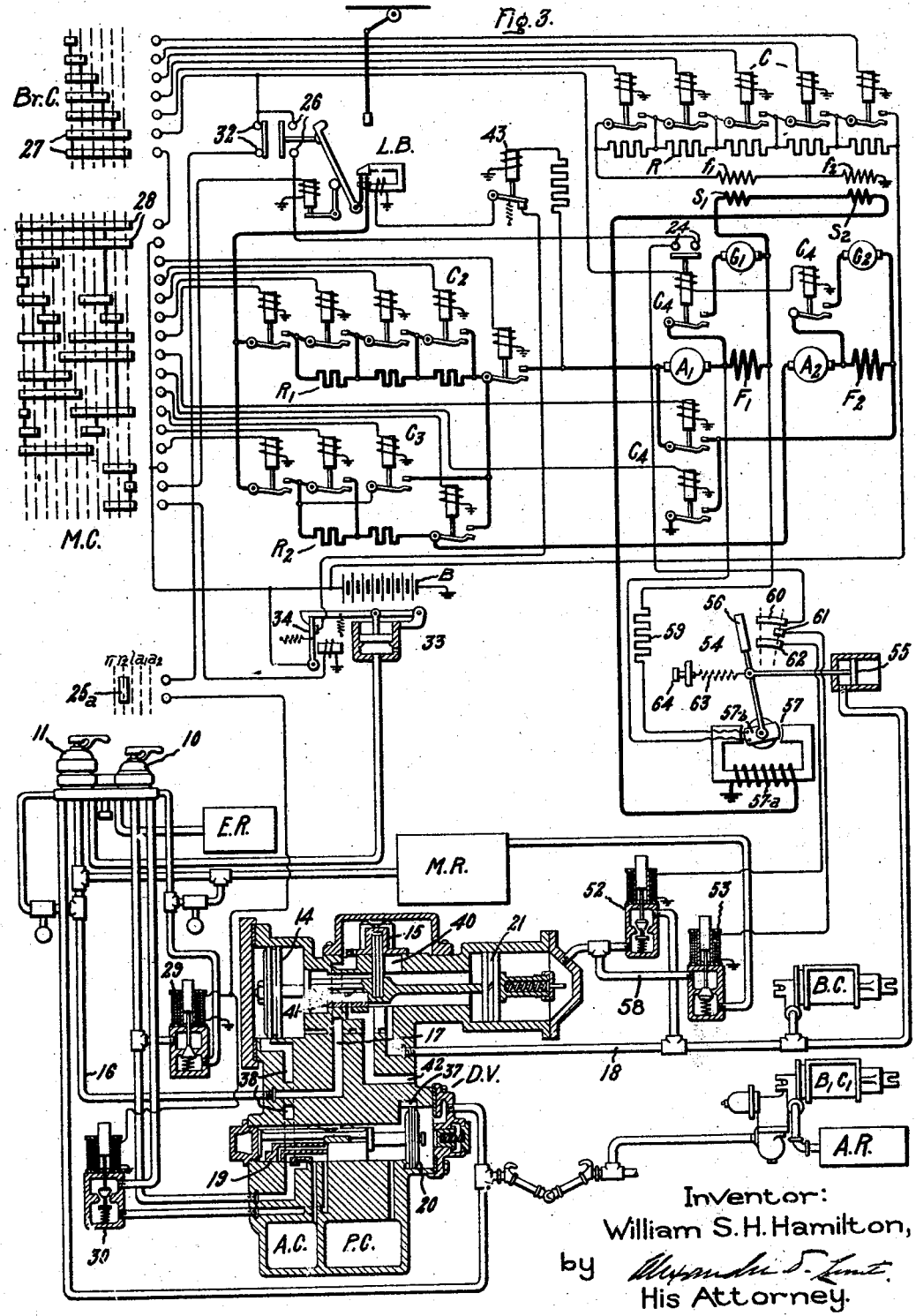

Patented Mar. 15, 1927.

1,621,403

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

BRAKING SYSTEM.

Application filed June 4, 1925. Serial No. 34,967.

This invention relates to braking systems for electric railway trains which are provided with both air braking means and electric braking means.

The object of the invention is to amplify the interlocking between the air brakes and the electric brakes beyond that which has been provided in systems now in use in order to permit more flexible and smoother handling of the electric locomotive and train.

It has been proposed heretofore to interlock the air and electric brakes on an electric locomotive or the like so as to permit the selective operation of either the air or the electric brakes while preventing the simultaneous application thereof, except in cases of emergency. Under some service conditions, however, it is advantageous to allow a certain amount of electric braking to be obtained on the locomotive before the air brakes are cut off and also to permit a limited application of the locomotive air brakes before the electric braking is discontinued in order to facilitate handling the train, as for example, when starting or stopping the train on a grade. Likewise, where the electric locomotive is provided with separately operable air and electric brakes and the cars drawn by the locomotives are provided only with the usual air brakes, it is desirable to permit automatic control of the air brakes on the cars as well as the locomotive while coordinating the air and electric brakes on the locomotive so as to insure that the combined air and electric braking on the locomotive never exceeds the value required to slide the wheels when the air brakes on the cars are applied although permitting independent application of the locomotive air brakes to full value at the will of the engineer at any time.

The above desirable results among others may be obtained by means of my invention which, in general, provides the following features:

1. The locomotive air and electric brakes may be simultaneously applied and the combined braking effect is automatically maintained at a maximum value which will not slip the wheels of the locomotive, although the relative proportion of air and electric braking may be varied.

2. If the electric brakes on the locomotive fail the air brakes are automatically applied at full value.

3. In case a service application of the car air brakes is made when the locomotive electric brakes are applied, the locomotive air brakes are applied automatically when the electric braking is reduced below a certain value.

4. In emergency full value of air braking may be applied to the locomotive and the cars and the electric brake is rendered inoperative.

In carrying the invention into effect in a preferred form an electrically controlled air operated piston is provided for controlling the operation of the distributing valve which ordinarily effects the application of the air brakes on the locomotive when a service application of the air brakes on the cars is made so that when the locomotive electric brakes are applied above a certain value, the air brakes on the locomotive are not applied. The air operated piston is electrically controlled by the electric braking control mechanism so as to automatically effect the application of the air brakes on the locomotive when the electric braking is reduced below the certain value. Preferably a device actuated responsively to the combined electric and air braking effect is arranged to control the application of the locomotive air brakes so as to maintain automatically the combined air and electric braking effect below the value required to slip the wheels. Furthermore, electrically controlled valve mechanism is arranged to automatically apply the air brakes on the locomotive and if desired on the cars in case the electric brakes on the locomotive should fail at any time.

The invention will be better understood by reference to the accompanying drawings in which Fig. 1 diagrammatically shows a braking system for an electric locomotive and the cars hauled thereby embodying the invention; Fig. 2 shows a modification of the system illustrated in Fig. 1; and Fig. 3 shows a similar braking system embodying automatic means for maintaining the combined air and electric braking effect on the locomotive at a predetermined value.

Referring to Fig. 1 of the drawing, the driving motors of the locomotive, comprising the armatures $A_1$, $A_2$, and the series field windings $F_1$, $F_2$, are arranged to be overexcited by the exciter generators $G_1$, $G_2$, respectively to effect regenerative electric braking of the locomotive. The exciter generators are arranged to be driven preferably at constant speed, by means not shown in the drawing, such as an electric motor. The series fields $S_1$, $S_2$ of the exciter generators $G_1$, $G_2$, respectively are connected to be energized by the generated current of the motors $A_1$, $A_2$, while the exciter generator shunt fields $f_1$, $f_2$, are connected to receive current from a suitable low voltage source such as the battery B through the regulating resistance R which may be varied by the operation of the electromagnetic contactors C under the control of the controller Br. C.

It will be observed that the driving motors $A_1$, $A_2$, of the locomotive are connected for series and parallel motoring and regenerating operation by means of suitable electromagnetic contactors $C_2$, $C_3$, $C_4$, which are arranged to be operated under the control of the main controller M. C. and the braking controller Br. C. in a well known manner.

The air brake system shown in the drawing is arranged to control the application of the air brakes on the electric locomotives, as well as on the cars drawn thereby. The braking cylinder B. C. applies the locomotive air brakes and a plurality of braking cylinders similar to the cylinder $B_1$, $C_1$, apply the car air brakes. Air is supplied to the main reservoir M. R. by an air compressor or other suitable means not shown and the equalizing reservoir E. R. is provided for controlling the emergency and service application of the air brakes on both the locomotives and the cars in the usual manner. The manual control of the air brakes is effected by means of two valves, one being the engineer's independent valve 10 which controls the application of the air brakes on the locomotive, but not on the remainder of the train and the other being the engineer's automatic valve 11 which controls the application of the brakes on both the locomotive and the cars. The independent valve 10 controls the admission of air from the main reservoir to the application pipe 12 leading to the distributing valve D. V., which is arranged to automatically control the admission of air from the main reservoir to the braking cylinder B. C. in a well known manner. The engineer's automatic valve 11 controls the admission and exhaust of air from the main reservoir to the train air line 13 which is connected to the distributing valve D. V. and also to the triple valve T. V., which controls the admission of air from the auxiliary reservoir A. R. to the braking cylinder $B_1$, $C_1$, with which each of the cars in the train may be provided. The distributing valve D. V. has a piston 14 for operating the application valve 15 which controls the admission of air from the main reservoir through the pipe 16, the passage 17, and the pipe 18, to the locomotive braking cylinder B. C. The admission of air from the pressure chamber P. C. to the application cylinder in which the piston 14 operates is under the control of the equalizing valve 19, which is operatively connected with the equalizing piston 20, so as to be operated responsively to a decrease in the pressure in the train air line 13 in the well known manner.

In order to prevent operation of the application valve 15 when the electric brakes are applied on the locomotive I provide the distributing valve with an auxiliary piston 21 which is mechanically connected to oppose the application piston 14. The admittance of air from the main reservoir M. R. to the right hand side of auxiliary piston 21 is under the control of the electromagnetic double valve 22 which is biased to normally establish communication between the right hand side of piston 21 and the braking cylinder B. C. through the pipe 23. The energizing circuit of electromagnetic valve 22 extends through and is jointly controlled by the auxiliary contacts 24 on one of the electromagnetic contactors $C_4$ which is closed during electric braking operation of the locomotive, the auxiliary contacts 25 associated with the engineer's independent valve 10 and the auxiliary contacts 26 which are closed when the line circuit breaker L. B. in the locomotive motor circuit is closed, the contact segments 27 of the braking controller Br. C., as well as the contact segments 28 of the main controller M. C. The auxiliary contacts 25 are arranged to be closed when the independent valve 10 is in either the released or the running positions $r_1$, $r_2$ and opened in the lap or application positions 1, $a_1$, $a_2$, respectively. The auxiliary contacts 27 on the braking controller are closed only after the controller has been operated to apply a certain amount of electric braking to the locomotive as, for example, to the 4th operating position as indicated in the drawing. These several auxiliary contacts insure that the valve 22 remains in the position in which it is shown until after a certain amount of electric braking has been applied to the locomotive. This permits the distributing valve D. V. to be operated automatically to apply the locomotive air brakes upon a service application of the car air brakes by the engineer's automatic valve 11 or by operation of the engineer's independent valve 10, as will be more fully pointed out hereinafter. However, when the braking controller 27 is operated beyond its third position to increase the electric braking the energizing circuit of electromagnetic valve 22 is completed and the valve 22 is operated to admit full pressure from the main reservoir M. R. to the right hand side of the auxiliary piston 21. This serves to effectively prevent operation of the application valve 15 even though pressure is admitted to the left hand side of the application piston 14 through operation of the equalizing valve 19 respectively to movements of the engineer's automatic valve 11. Should the braking controller be returned to the third position to reduce the amount of electric braking on the locomotive the electromagnetic valve 22 is deenergized and returns to the position in which it is shown to exhaust pressure from the right hand side of auxiliary piston 21 and thereby permit the pressure which may be applied to the left hand side of application piston 14 to operate the application valve 15 so as to supply pressure from the main reservoir through the pipes 16 and 18 to the braking cylinder B. C. and automatically reapply the locomotive air brakes.

In order to automatically apply the air brakes on the locomotive in case electric braking should fail for any reason, the electromagnetic valves 29 and 30 are arranged to be energized to respectively admit pressure to the application pipe 12 and close the release pipe 31. Briefly, this is accomplished through the agency of the auxiliary contacts 32 which are closed when the locomotive line breaker L. B. is open as indicated in the drawing and the lower auxiliary contacts 25ª on the engineer's independent valve 10 which are closed only when the valve is in the running position $r_2$.

Emergency application of the car brakes made by means of the engineer's automatic valve 11 causes the locomotive air brakes to be applied at full value and also renders the electric brakes inoperative by operation of the pressure responsive device 33. As shown, the pressure device 33 is arranged to mechanically latch the switch 34 in the closed position and is connected through the pipe 35 to respond to operation of the automatic engineer's valve 11 to the emergency position and release the switch 34. The opening of switch 34 interrupts the energizing circuit of the holding winding 36 of the line breaker L. B. and the latter operates to the open position in which it is shown, thus interrupting the circuit of the motors $A_1$, $A_2$ during either regenerative braking operation or motoring operation when an emergency application of the air brakes on the train is made.

The operation of the electric regenerative braking system, which is most commonly used when the train is proceeding on a down grade, is simple and will readily be understood by those skilled in the art from the following description. In order to apply the regenerative braking, the main controller M. C. is operated to connect the motors in either series or parallel relation and control the electromagnetic contactors $C_2$, $C_3$ to remove a desired amount of the resistors $R_1$, $R_2$ from the motor circuits. The braking controller Br. C. then is moved into a selected one of its operating positions to operate the electromagnetic switches $C_4$ to connect the exciting generators $G_1$, $G_2$ to the motor series fields $F_1$ and $F_2$ and to operate the electromagnetic contactors C to produce a desired excitation of the exciter shunt field windings $f_1$, $f_2$. Under these conditions the series fields $F_1$, $F_2$ of the motors are excited beyond the normal value and develop in the motors a counter-electromagnetic force sufficient to return current to the trolley line T, and thereby exert an electric braking effect upon the locomotive.

With the braking controller Br. C. in either of its first three operating positions only a limited amount of electric braking will be obtained. Under these conditions the energizing circuit of the electromagnetic valve 22 is interrupted at the contact segments 27 of the braking controller and the right hand side of the auxiliary piston 21 is connected to the braking cylinder B. C. through the pipe 23. Thus if the engineer's automatic valve 11 is operated to reduce the pressure in the train air line 13 to cause the triple valve T. V. on the cars to admit air from the auxiliary reservoir A. R. to the application cylinder $B_1$, $C_1$, and thereby apply the car air brakes, the distributing valve D. V. operates to simultaneously apply the air brakes on the locomotive in the following manner. Upon reduction of the pressure in the train air line 13 the air which previously has been admitted to the pressure chamber P. C. through the leakage groove 37 moves the equalizing piston 20 to the right beyond the leakage groove 37. This operates the equalizing valve 19 to the right to permit the air in pressure chamber P. C. to expand into the application chamber A. C. and at the same time pass through the passage 38 to the left hand side of application piston 14 until equalization of the pressures on the opposite sides of piston 20 occurs. Piston 14 responds to the pressure admitted into the application chamber A. C. to move the application valve 15 to the right until the restricted orifice 39 registers with the opening 40. This establishes communication between the main reservoir M. R. and the braking cylinder B. C. through the reservoir pressure line 16, the passage 17, orifice 39, chamber 40, and the pipe 18. When the air pressure applied to the braking cylinder B. C. and also exerted upon the right hand side of application piston 14 exceeds the pressure applied to the left hand side of the piston 14, the latter is moved slightly to the left to close the application valve 15. Thus the pressure supplied to the locomotive braking cylinder B. C. depends upon the reduction in pressure in the train air line 13 and upon an ordinary service application of the car air brakes always is such that the combined air and braking effect on the locomotive is below the value required to slip the wheels.

If now the braking controller Br. C. is moved beyond its third operating position the energizing circuit of the electromagnetic valve 22 is completed at the contacts 27 and the valve responds to admit full pressure from the main reservoir M. R. to the right hand side of auxiliary piston 21. Since the full reservoir pressure upon the auxiliary piston 21 exceeds the reduced pressure upon the application piston 14 the latter is moved to its extreme left hand position and operates the exhaust valve 41 to open communication between the brake cylinder B. C. and atmosphere through the passage 42 and thereby release the air brakes on the locomotive.

If now the regenerative braking of the locomotive should fail due to either an excessive overload current or an over-voltage, such as may occur upon a failure of the source supplying the trolley T, the former causing the line breaker instantly to open and the latter causing the over-voltage relay 43 to interrupt the circuit of the holding winding 36 and thereby open the line breaker, the air brakes are automatically applied on the locomotive at full value in the following manner. The opening of the line breaker opens the energizing circuit of the electromagnetic valve 22 at the contacts 26 and closes the energizing circuit of the electromagnetic valves 29 and 30 at the auxiliary contacts 32. Upon the deenergization of the electromagnetic valve 22 the main reservoir pressure is exhausted from the right hand side of auxiliary piston 21 through the pipe 23 into the braking cylinder B. C. Thus when the electromagnetic valves 29 and 30 respond respectively to admit pressure from the main reservoir through the reducing valve 44 to the application pipe 12 and at the same time close the release pipe 31, the application piston 14 is subjected to its full normal pressure and moves to the right to establish communication between the main reservoir M. R. and the locomotive braking cylinder B. C. through the pipe 16, the passage 17, chamber 40 and the pipe 18.

With full main reservoir pressure applied to the locomotive braking cylinder B. C. the locomotive air brakes are applied automatically at full value to prevent the locomotive from pulling away from the train upon failure of the electric regenerative braking. Under ordinary operating conditions the engineer at once will operate the automatic valve 11 to the application position in order to apply the air brakes on the cars and bring the train to a stop until after the defect in the electric braking is remedied.

If it is desired to eliminate the operation of the valve 11 by the engineer upon a failure of the electric regenerative braking, the simultaneous application of the air brakes on the cars and the locomotive may be automatically effected by the arrangement shown in Fig. 2. This is accomplished by providing the electromagnetic valve 30 for closing the release pipe 31 in the manner previously described, and also providing an electromagnetic valve 46 for controlling the admission of air from the main reservoir M. R. through the feed valve 47, the pipe 48 and the valve 11 to the train air line 13. It will be understood that the feed valve 47 automatically maintains the proper pressure in the train air line and that the equalizing reservoir E. R. is normally connected to the train air line 13 when the engineer's automatic valve 11 is in the running position $r_3$. A second electromagnetic valve 49 having its operating winding connected to be energized in parallel with the operating windings of valves 30 and 46, is arranged when energized to exhaust air from the equalizing reservoir E. R. into the storage reservoir S. R. and thereby reduce the pressure in the train air line 13 a predetermined amount, preferably an amount sufficient to effect a heavy service application of the car air brakes. It will be observed that the energizing circuit for the electromagnetic valves 30, 46 and 49 extends through the auxiliary contacts 50 on one of the contactors $C_4$ and the auxiliary contacts 51 associated with the engineer's automatic valve 11, as well as the auxiliary contacts 32, which are closed when the line breaker L. B. is opened. The auxiliary contact 50 is closed when the contactors $C_4$ are closed to establish the electric braking connections of the locomotive, while the auxiliary contact 51 is closed only when the engineer's automatic valve 11 is in the normal running position $r_3$.

The auxiliary piston 21 and the electromagnetic valve 22 serve to prevent operation of the distributing valve D. V. to apply the locomotive air brakes when the braking controller Br. C. is beyond a predetermined operating position in exactly the same manner as previously described in connection with Fig. 1. Thus, while the electric regenerative brakes are applied beyond a certain value on the locomotive, a service application of the car brakes cannot effect application of the locomotive air brakes. However, upon failure of the electric braking the air brakes on both the cars and the locomotive are simultaneously applied in the following manner. Upon opening of the line breaker L. B. responsively to a failure of electric braking, the electromagnetic valve 22 is deenergized upon the opening of the auxiliary contacts 26 and the electromagnetic valves 46 and 49 are energized upon the closure of the auxiliary contacts 32. The valve 30 at once operates to close the release pipe 31 and the valve 46 operates to close communication between the main reservoir and the train air line 13. At the same time the electromagnetic valve 49 operates to reduce the pressure in the equalizing reservoir E. R. and also the pressure in the air line 13. This permits the triple valve T. V. to admit air from the auxiliary reservoir A. R. to the car braking cylinders $B_1$, $C_1$ and also causes the equalizing piston 20 to operate the equalizing valve 19 to exhaust the air from the pressure chamber P. C. into the application chamber A. C. The air pressure in application chamber A. C. is applied to the left hand side of application piston 14 through the passage 38, since the release pipe 31 is closed by valve 30. This causes movement of the application piston 14 to admit pressure from the main reservoir M. R. to the locomotive braking cylinder B. C. through the pipe 16, the application valve 15 and the pipe 18, as previously described. The braking effect of the locomotive and car air brakes ordinarily will exceed the electric regenerative braking effect previously exerted by the locomotive, and hence will serve to maintain the speed of the train within safe limits.

The pressure responsive device 33 shown in Fig. 2 renders the electric braking inoperative on an emergency application of the train air brakes in the same manner as previously described in connection with Fig. 1.

The braking system shown in Fig. 3 embodies the electromagnetic valves 29 and 30 previously described in connection with Fig. 1, for automatically applying the air brakes upon the locomotive when the electric braking fails, as well as the pressure responsive device 33 for rendering the electric brakes inoperative upon an emergency application of the air brakes on both the locomotive and the cars of the train and, in addition, is provided with automatic means for maintaining the combined air and electric braking effect on the locomotive at a suitable value which will not slip the wheels. The automatic means in the system illustrated comprise essentially the electromagnetic valves 52 and 53, together with the relay 54. The valve 52 is normally biased to admit air from the right hand side of the auxiliary piston 21 to the air line 18 of the braking cylinder B. C., while the valve 53 is normally biased to cut off communication between the main reservoir M. R. and the right hand side of piston 21. The relay 54 is arranged to be operated responsively to the combined air and electric braking effect on the locomotive. This is accomplished by connecting the piston 55 which is at all times responsive to the pressure in the air line of the braking cylinder B. C., and hence is operated in accordance with the air braking effect on the locomotive to the movable circuit controlling member 56 of the relay which is operated responsively to the electric braking effect on the locomotive by the electromagnetic actuating mechanism 57. The actuating mechanism 57 operates on the well known wattmeter principle and has one winding $57^a$ energized responsively to the regenerated current of the motors. A second winding $57^b$ of the actuating mechanism is connected across the series field winding $F_1$ of one of the motors to be energized responsively to the field current of the motors. If desired, a regulating resistance 59 may be connected in circuit with the winding $57^b$ as shown in the drawing to permit calibration of the actuating mechanism. The movable controlling member 56 of the relay is biased out of engagement with the stationary contact segments 60, 61, 62 by means of the spring 63, the tension of which may be adjusted by means of the adjusting screw 64.

The automatic relay 54 separately controls the energizing circuits of the electromagnetic valves 52 and 53 which extend from the battery B through the contact segments 28 of the main controller M. C., segments 27 of the braking controller Br. C. auxiliary contacts 26 on the line breaker L. B. and the auxiliary contact 24 of one of the electromagnetic contactors $C_4$. Thus when the main controller M. C. is operated to close the line breaker L. B. and establish series or parallel connections of the motors and the braking controller Br. C. is moved into a desired braking position to close the electromagnetic contactor $C_4$ and control the energization of the shunt field windings $f_1$, $f_2$ by operation of the proper contactors C to effect regenerative braking operation of the locomotive, both of the windings $57^a$ and $57^b$ of the electric actuating mechanism 57 are energized. The actuating mechanism 57 thus exerts a torque upon the movable contact arm 56 proportional to the value of the torque exerted by the traction motors of the locomotive during electric braking. If now a service application of the train air brakes is made by moving the engineer's automatic valve 11, air is admitted from the pressure chamber P. C. to the application chamber A. C. and also to the left hand side of the application piston 14 of the distributing valve D. V. as previously described. Piston 14 responds to move the application valve 15 to admit air from the main reservoir through the reservoir pressure line 16, the passage 17, to the air pipe 18 of the braking cylinder B. C. and thereby apply a certain amount of air braking on the locomotive. As previously pointed out, the piston 55 is responsive to the pressure in the braking cylinder air pipe 18, and consequently exerts a force upon the contact arm 56 in the same direction as the electric actuating mechanism 57. If the added force of the piston 55 which corresponds to the amount of air braking on the locomotive is sufficient to move the contact arm 56 into engagement with the cooperating segments 60 and 62, thus indicating that the combined air and electric braking on the electric locomotive is approaching the value at which the wheels may slide, the energizing circuit of the electromagnetic valve 52 is closed. Thereupon the valve 52 responds to close the connection between the right hand side of the piston 21 and the braking cylinder pipe 18. A further increase in the pressure in the braking cylinder B. C. will cause the piston 55 to move the arm 56 further to the right into contact with contacts 61. This establishes a circuit from contacts 60 through the coil of valve 53 in parallel with that of coil 52. The valve 53 operates to open and admit air from the main reservoir M. R., valve 53, the pipe 58 to the right hand side of piston 21. This causes a pressure to be built up on the right hand side of piston 21 greater than that on the left hand side of piston 14. Consequently, piston 21 moves the valve 15 toward the left shutting off the connection from main reservoir M. R. through the pipe 16, passage 17, valve 15, passage 40 and pipe 18 to the braking cylinder B. C. Valve 15 in its movement uncovers passage 42 and permits air to exhaust from the braking cylinder B. C., pipe 18, valve 15 and passage 42 to atmosphere, thus causing a reduction in the pressure in braking cylinder B. C. and on the piston 55 of device 54. When the pressure against piston 55 is reduced sufficiently, the spring 63 pulls the movable contact 56 out of engagement with the contacts 61, thus deenergizing the valve 53, which in turn closes the connection between the main reservoir M. R., valve 53, pipe 58 and the right hand side of piston 21. This leaves a certain amount of air pressure trapped in the chamber on the right hand side of piston 21 and this pressure is opposed by the pressure on the left hand side of piston 14. This will result in valve 15 moving toward the right sufficiently to close the passage between pipe 18, passage 42 and atmosphere. Under this condition the pressure in the braking cylinder B. C. is substantially the difference between the pressure on the left hand side of piston 14 and the pressure on the right hand side of piston 21. The pressure in the braking cylinder B. C. is sufficient through action on piston 55 to cause the movable arm 56 to remain in contact with contacts 60 and 62.

If now the braking controller Br. C. is operated to decrease the electric braking on the locomotive, the torque of the electric actuating mechanism 57 is correspondingly decreased and the biasing spring 63 serves to move the contact arm 56 out of engagement with the segments 60 and 62. This deenergizes the electromagnetic valve 52 and the latter operates to reestablish connection between the right hand side of auxiliary piston 21 and the braking cylinder air pipe 18. The reduction in pressure upon the right hand side of the piston 21 permits the piston 14 to move the application valve 15 to the right to increase the amount of air braking on the locomotive to a value which combined with the reduced electric braking will not slip the wheels of the locomotive.

Should the braking controller Br. C be moved to an operative position in which the excitation of the exciter shunt field windings $f_1$, $f_2$, is increased and a correspondingly greater regenerative braking effect is obtained upon the locomotive, the increased torque of the electric actuating mechanism 57 in conjunction with the force of the piston 55 may be sufficient to move the contact arm 56 successively into engagement with the segments 60, 62 and 61. Upon engagement of segments 60 and 62 the electromagnetic valve 52 is energized to close communication between the braking cylinder air pipe 18 and the right hand side of piston 21, and upon engagement with the segment 61 the electromagnetic valve 53 is energized to admit air from the main reservoir M. R. directly to the right hand side of piston 21. The increased pressure upon piston 21 overcomes the opposing pressure upon piston 14 and operates the latter to its extreme left hand position, thus opening the exhaust valve 41 to release air from the braking cylinder B. C. through the exhaust pipe 42.

When the amount of air braking on the locomotive is reduced to such an extent that combined with the existing electric braking there is no danger of slipping the wheels of the locomotive, the reduced pressure upon the piston 55 of the relay 54 permits the contact arm 56 to move out of engagement with the segment 61. In this way the electromagnetic valve 53 is deenergized and cuts off the main reservoir pressure supply from the right hand side of piston 21 and traps a certain air pressure on the right hand side of piston 21. This, in combination with the pressure on the left hand side of piston 14 will bring the valve 15 to a position of equilibrium with a suitable pressure in the braking cylinder Br. C. as previously described.

Should the amount of regenerative electric braking be built up to a high value, the contact 56 of the device 54 is held in the extreme right hand position, thereby keeping the contacts 60, 61 and 62 closed and the valves 52 and 53 energized. These valves then permit full main reservoir pressure to remain applied to the right hand side of piston 21. This maintains the valve 15 in the extreme left hand position as shown and keeps the pipe 18 connected through the passage 42 to exhaust, thus entirely releasing the brakes on the locomotive. This condition will continue regardless of the amount of application of the air brakes on the cars until the electric braking is reduced by manipulation of the braking controller Br. C.

From the foregoing it will be evident that the relay 54 operates to automatically maintain the combined air and electric braking effects upon the locomotive at substantially a maximum value which, however, is insufficient to slide the wheels of the locomotive. If desired the electromagnetic valve 29 may be replaced by electromagnetic valves 46 and 49 described in connection with Fig. 2 in order to automatically apply the air brakes upon the cars, as well as the locomotive, in case of failure of the electric brakes.

While I have described the preferred embodiments of the invention in order to explain the principles thereof, it will be understood that the invention is not limited to the particular apparatus shown and may be carried out by other means.

What I claim as new and desire to secure by Letters Patent of the United States, is:

1. In a braking system for railway trains, the combination with separately and jointly operable air braking and electric braking means, of control means selectively operable to effect separate or joint operation of said braking means, and automatic means effective during separate operation of one of said braking means for insuring application of the other braking means upon failure of said one braking means.

2. In a braking system for railway trains, the combination with separately and jointly operable air braking and electric braking means, of separate controllers therefor operable at will to effect separate or joint application of said braking means, of means under the joint control of said separately operable controllers for insuring a predetermined application of one of said braking means upon failure of the other during separate application thereof.

3. In a braking system for railway trains, the combination of separately and jointly operable air braking means and electric braking means, control means selectively operable to effect separate or simultaneous application of said braking means, and electrically controlled air operated means effective during separate application of the electric brakes for automatically applying the air brakes upon failure of the electric brakes.

4. In a braking system for railway trains, the combination with means for applying air brakes to a railway train unit and means for applying electric braking to the same unit, the two braking means being each normally separately operable, of an electrically controlled air operated valve mechanism controlled by said electric braking means for automatically effecting a predetermined application of the air brakes upon failure of the electric brakes.

5. In a braking system for railway trains, the combination with separately and jointly operable air braking and electric braking means, of a manually controlled valve mechanism operable at will to apply the air brakes separately and jointly with the electric brakes, and an electrically operated valve mechanism effective during separate application of the electric brakes for automatically applying the air brakes upon failure of the electric brakes.

6. In a braking system for railway trains, the combination with separately and jointly operable air braking and electric braking means, of an air operated distributing valve for controlling the separate and joint application of different portions of the air brakes, a plurality of manual control valves for controlling the operation of said distributing valve, and independent electrically operated valve mechanism effective during separate operation of the electric braking means for automatically controlling said distributing valve to effect the joint application of the different portions of said air brakes upon failure of the electric brakes.

7. In a braking system for railway trains, the combination with separately operable air braking means and electric braking means, of an automatic device arranged to be operated responsively to failure of said electric braking means, and an electromagnetic valve mechanism controlled by said device for automatically effecting a predetermined application of the said air braking means upon operation of said device.

8. In a braking system for railway trains, the combination with manually operable means for applying air brakes to a railway train unit and manually operable means for applying electric braking to the same unit, the two braking means being each normally separately operable, of an electroresponsive device connected to be operated responsively to failure of the electric braking means, an electrically controlled valve mechanism for applying the air brakes to the train unit independently of said first means, and connections controlled by said first means and said electroresponsive device for automatically energizing said electromagnetic valve mechanism to effect a predetermined application of the air brakes upon operation of said electroresponsive device when said first means is in the inactive position.

9. In a braking system for railway trains, the combination with simultaneously operable air braking means and electric braking means, of connections between the two braking means for preventing the simultaneous operation thereof when one of said braking means is applied above a predetermined value and for automatically applying the other braking means when the application of said one means is reduced.

10. In a braking system for railway trains, the combination with means for applying air brakes to a railway train unit and means for applying electric braking to the same unit, the two braking means being each normally separately operable, of an electrically controlled air operated device for preventing the simultaneous operation of said air braking means when said electric braking means is applied above a predetermined value and for automatically effecting the application of said air braking means when the application of said electric braking means is reduced.

11. In a braking system for railway trains the combination with means for applying air brakes to a railway train unit and means for applying electric braking to the same unit, the two braking means being simultaneously operable when the application of the electric braking is below a predetermined value, of an electrically controlled air operated device for automatically releasing the air brakes when the electric braking is increased above said amount and for automatically reapplying the air brakes when the electric braking is subsequently reduced below said value.

12. In a braking system for railway trains, the combination with simultaneously operable air braking means and electric braking means, of an electrically controlled air operated device associated with said air braking means and connected to be jointly controlled by said air and said electric braking means for preventing the simultaneous operation of the air braking means when the electric braking means is applied above a predetermined value and for automatically effecting the application of said air braking means when the application of the electric brakes is reduced below said value.

13. In a braking system for railway trains, the combination with simultaneously operable air braking means and electric braking means, of connections between the two braking means for automatically varying the application of one of said means inversely with variations in the other of said means.

14. In a braking system for railway trains, the combination with simultaneously operable air braking means and electric braking means, of connections between the two braking means for preventing the simultaneous application thereof when one of said braking means is applied above a predetermined value and for automatically varying the application of the other braking means when the application of said one means is varied below said predetermined value.

15. In a braking system for railway trains, the combination with means for applying air brakes to a railway train unit and means for applying electric braking to the same unit, the two braking means being each normally separately operable, of connections between the two brakes permitting the simultaneous application of a predetermined value of braking by the two brakes and for automatically varying the application of one of the brakes inversely with variations in the application of the other brake.

16. In a braking system for railway trains, the combination with means for applying air brakes to a railway train unit and means for applying electric braking to the same unit, the two braking means being each normally separately operable, of an automatic device arranged to be operated responsively to the combined braking effect of the two braking means, and connections between the two brakes controlled by said device for permitting the simultaneous application of a predetermined value of braking by the brakes and for automatically varying the application of one of the brakes inversely with variations in the application of the other brake.

17. In a braking system for railway trains, the combination with means for applying air brakes to a railway train unit and means for applying electric braking to the same unit, the two braking means being each normally separately operable, of a combined electroresponsive and pressure responsive device arranged to be operated responsively to the combined braking effect of said two braking means, an electrically controlled air operated device associated with said air braking means for independently controlling the application and release thereof, and connections controlled by said combined air and pressure responsive device for controlling the said pressure operated device to permit the simultaneous application of a predetermined value of braking by the said air and electric braking means and to automatically release said air brakes a predetermined amount upon a predetermined increase in the electric braking and apply said air brakes a predetermined amount upon a predetermined decrease in the electric braking.

In witness whereof, I have hereunto set my hand this 29th day of May 1925.

WILLIAM S. H. HAMILTON.